US012627828B2

(12) United States Patent　　　　(10) Patent No.: US 12,627,828 B2
Leléannec et al.　　　　　　　　　(45) Date of Patent: May 12, 2026

(54) METHODS AND APPARATUS OF ENCODING/DECODING VIDEO PICTURE DATA

(71) Applicant: Beijing Xiaomi Mobile Software Co., Ltd., Beijing (CN)

(72) Inventors: Fabrice Leléannec, Beijing (CN); Pierre Andrivon, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 16 days.

(21) Appl. No.: 18/853,591

(22) PCT Filed: Mar. 3, 2023

(86) PCT No.: PCT/CN2023/079676
§ 371 (c)(1),
(2) Date: Oct. 2, 2024

(87) PCT Pub. No.: WO2023/193557
PCT Pub. Date: Oct. 12, 2023

(65) Prior Publication Data
US 2025/0227281 A1　　Jul. 10, 2025

(30) Foreign Application Priority Data
Apr. 7, 2022　(EP) .................................... 22305478

(51) Int. Cl.
*H04N 19/51*　　　(2014.01)
*H04N 19/176*　　(2014.01)
*H04N 19/184*　　(2014.01)

(52) U.S. Cl.
CPC ........... *H04N 19/51* (2014.11); *H04N 19/176* (2014.11); *H04N 19/184* (2014.11)

(58) Field of Classification Search
CPC .... H04N 19/51; H04N 19/176; H04N 19/184; H04N 19/563; H04N 19/577; H04N 19/55
See application file for complete search history.

(56) References Cited

U.S. PATENT DOCUMENTS

| 2019/0082193 | A1* | 3/2019 | Sun | ......................... H04N 19/82 |
| 2019/0394460 | A1* | 12/2019 | Lee | ....................... H04N 19/182 |
| 2020/0195955 | A1* | 6/2020 | Drugeon | .............. H04N 19/176 |

OTHER PUBLICATIONS

European Search Report for EP application 22305478.4, dated Sep. 14, 2022.

(Continued)

*Primary Examiner* — Richard T Torrente
(74) *Attorney, Agent, or Firm* — Finnegan, Henderson, Farabow, Garrett & Dunner, L.L.P.

(57) ABSTRACT

A method for encoding a video picture into a bitstream of encoded video picture data, includes: temporal predicting a video picture block by obtaining a temporal predicted block based on at least one reference block of at least one reference picture pointed to by at least one motion vector associated with the video picture block, wherein if the temporal prediction of the video picture block is based on a single reference block of a reference picture, the method further includes padding the reference block based on a motion vector derived from a nearest subblock of the current block inside the video picture.

14 Claims, 10 Drawing Sheets curent picture　　　　　　　reference picture

(56) References Cited

OTHER PUBLICATIONS

International Search Report and Written Opinion for PCT application PCT/CN2023/079676, dated May 26, 2023.

Y. Chen et al., "Description of SDR, HDR and 360° video coding technology proposal by Qualcommand Technicolor-low and high complexity versions", Joint Video Exploration Team of ITU-T, SG16 WP3 and ISO/IEC JTC 1/SC 29/WG 11. 10th Meeting: San Diego. Apr. 10-20, 2018.

Y. Chen et al., "AHG12: Enhanced bi-directional motion compensation", Joint Video Exploration Team of ITU-T, SG16 WP3 and ISO/IEC JTC 1/SC 29. 25th meeting, by teleconference, Jan. 12-21, 2022.

* cited by examiner

NxN   2Nx2N   Nx2N   2NxN nLx2N   nLx2N   2NxnU   2NxnD

400

401

$b = $ first 4xM or Mx4 block

402

Get the prediction mode of the nearest 4x4 block nb

403

Intra-coded block nb?

*yes*

*no*

404

405

406

End?

*no*

*yes*

END

METHODS AND APPARATUS OF ENCODING/DECODING VIDEO PICTURE DATA

CROSS-REFERENCE TO RELATED APPLICATIONS

This application is a US national phase application of International Application No. PCT/CN2023/079676, filed on Mar. 3, 2023, which is based on and claims priority to European Patent Application No. 22305478.4, filed on Apr. 7, 2022, the entire content of both of which is incorporated herein by reference.

FIELD

The present disclosure generally relates to video picture encoding and decoding. Particularly, but not exclusively, the technical field of the present disclosure is related to motion-compensated temporal prediction with reference blocks overlapping the boundaries of a reference picture.

BACKGROUND

In the state-of-the-art video compression systems such as HEVC or VVC, low-level and high-level picture partition-ing are provided to divide a video picture into picture areas so-called Coding-Tree Units (CTU) which size may be typically between 16×16 and 64×64 pixels for HEVC and 32×32, 64×64, or 128×128 pixels for VVC.

SUMMARY

According to a first aspect of the present disclosure, there is provided a method of encoding a video picture into a bitstream of encoded video picture data, the method com-prising temporal predicting a video picture block by obtain-ing a temporal predicted block based on at least one refer-ence block of at least one reference picture pointed to by at least one motion vector associated with the video picture block, wherein if the temporal prediction of the video picture block is based on a single reference block of a reference picture, then the method further comprises padding the reference block based on a motion vector derived from a nearest subblock of the current block inside the video picture.

According to a second aspect of the present disclosure, there is provided a method for decoding a video picture from a bitstream of encoded video picture data, the method comprising temporal predicting a video picture block by obtaining a temporal predicted block based on at least one reference block of at least one reference picture pointed to by at least one motion vector associated with the video picture block, wherein if the temporal prediction of the video picture block is based on a single reference block of a reference picture, then the method further comprises pad-ding the reference block based on a motion vector derived from a nearest subblock of the current block inside the video picture.

According to a third aspect of the present disclosure, there is provided an apparatus comprising means for performing one of the method according to the first and/or second aspect of the present disclosure.

BRIEF DESCRIPTION OF THE DRAWINGS

Reference will now be made, by way of example, to the accompanying drawings which show exemplary embodi-ments of the present disclosure, and in which.

Similar or same elements are referenced with the same reference numbers.

DESCRIPTION OF EXEMPLARY EMBODIMENTS

At least one of the exemplary embodiments is described more fully hereinafter with reference to the accompanying figures, in which examples of at least one of the exemplary embodiments are depicted. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the present disclosure is intended to cover all modifications, equivalents, and alternatives falling within the spirit and scope of the present disclosure.

In the state-of-the-art video compression systems such as HEVC (ISO/IEC 23008-2 High Efficiency Video Coding, ITU-T Recommendation H.265, https://www.itu.int/rec/T-REC-H.265-202108-P/en) or VVC (ISO/IEC 23090-3 Ver-satile Video Coding, ITU-T Recommendation H.266, https://www.itu.int/rec/T-REC-H.266-202008-I/en, low-level and high-level picture partitioning are provided to divide a video picture into picture areas so-called Coding-Tree Units (CTU) which size may be typically between 16×16 and 64×64 pixels for HEVC and 32×32, 64×64, or 128×128 pixels for VVC.

The CTU division of a video picture forms a grid of fixed size CTUs, namely a CTU grid, which upper and left boundaries spatially coincide with the top and left borders of the video picture. The CTU grid represents a spatial partition of the video picture.

In VVC and HEVC, the CTU size (CTU width and CTU height) of all the CTUs of a CTU grid equals a same default CTU size (default CTU width CTU DW and default CTU height CTU DH). For example, the default CTU size (default CTU height, default CTU width) may equal to 128 (CTU DW=CTU DH=128). A default CTU size (height, width) is encoded into the bitstream, for example at a sequence level in the Sequence Parameter Set (SPS).

The spatial position of a CTU in a CTU grid is determined from a CTU address ctuAddr defining a spatial position of the top-left corner of a CTU from an origin. As illustrated on FIG. 1, the CTU address may define the spatial position from the top-left corner of a higher-level spatial structure S containing the CTU.

A coding tree is associated with each CTU to determine a tree-division of the CTU.

Figure 1:
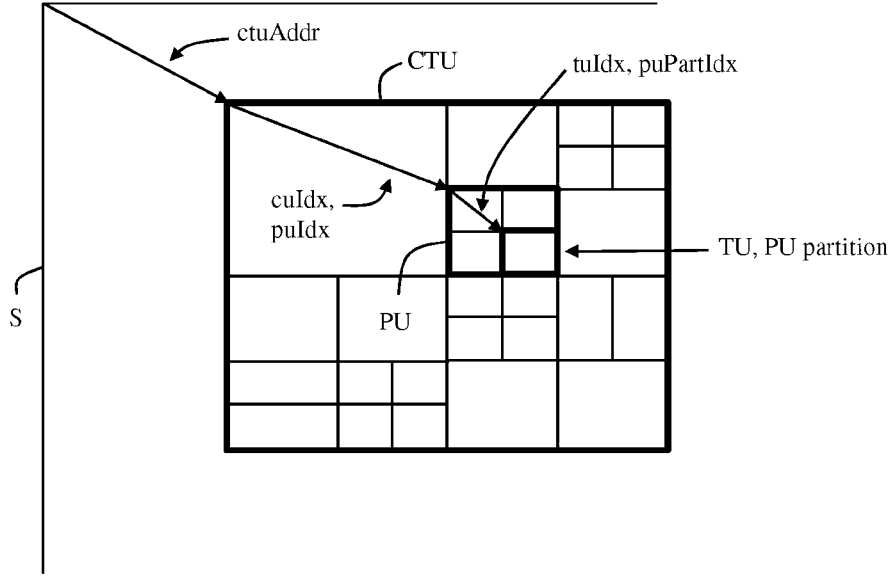
FIG. 1 shows an example of coding-tree unit in accor-dance with HEVC.

As illustrated on FIG. 1, in HEVC, the coding tree is a quad-tree division of a CTU, where each leaf is called a Coding Unit (CU). The spatial position of a CU in the video picture is defined by a CU index cuIdx indicating a spatial position from the top-left corner of the CTU. A CU is spatially partitioned into one or more Prediction Units (PU). The spatial position of a PU in the video picture VP is defined by a PU index puIdx defining a spatial position from the top-left corner of the CTU and the spatial position of an element of a partitioned PU is defined by a PU partition index puPartIdx defining a spatial position from the top-left corner of a PU. Each PU is assigned some intra or inter prediction data.

The coding mode intra or inter is assigned on the CU level. That means that a same intra/inter coding mode is assigned to each PU of a CU, though the prediction parameters varying from PU to PU.

A CU may be also spatially partitioned into one or more Transform Units (TU), according to a quad-tree called the transform tree. Transform Units are the leaves of the transform tree. The spatial position of a TU in the video picture is defined by a TU index tuIdx defining a spatial position from the top-left corner of a CU. Each TU is assigned some transform parameters. The transform type is assigned on the TU level, and 2D separate transform is performed at TU level during the coding or decoding of a picture block.

Figure 2:
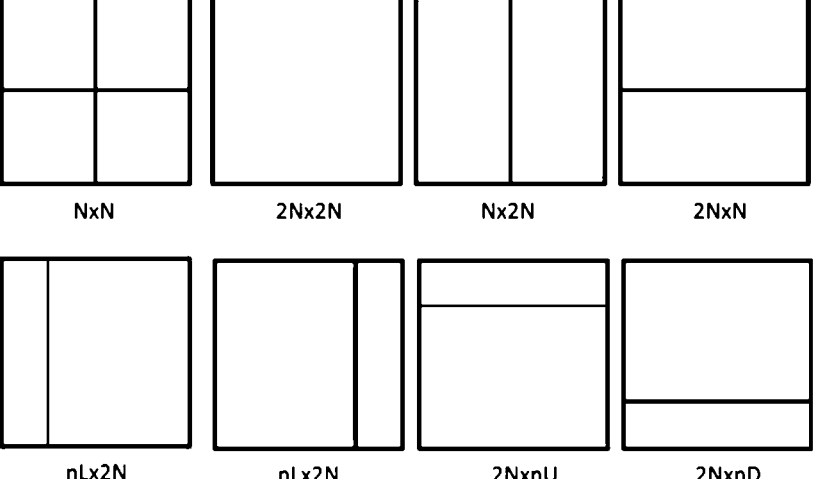
FIG. 2 shows an example of partitioning coding units into prediction units in accordance with HEVC.

The PU Partition types existing in HEVC are illustrated on FIG. 2. They include square partitions (2N×2N and N×N), which are the only ones used in both Intra and Inter prediction CUs, symmetric non-square partitions (2N×N, N×2N, used only in Inter prediction CUs), and asymmetric Partitions (used only in Inter prediction CUs). For instance, the PU type 2N×nU stands for an asymmetric horizontal partitioning of the PU, where the smaller partition lies on the top of the PU. According to another example, PU type 2N×nL stands for an asymmetric horizontal partitioning of the PU, where the smaller partition lies on the top of the PU.

Figure 3:
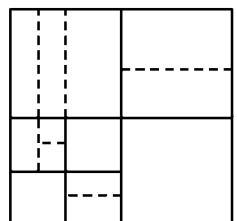
FIG. 3 shows an example of a CTU division in accordance with VVC.
Figure 3:
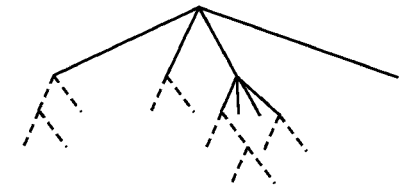
Figure 4:
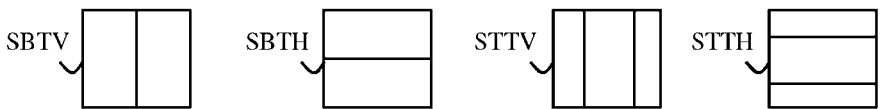
FIG. 4 shows examples of split modes supported in the multi-type tree partitioning in accordance with VVC.

As illustrated on FIG. 3, in VVC, the coding tree starts from a root node, i.e. the CTU. Next, a quad-tree (or quaternary tree) split divides the root node into 4 nodes corresponding to 4 sub-blocks of equal sizes (solid lines). Next, the quaternary tree (or quad-tree) leaves can then be further partitioned by a so-called multi-type tree, which involves a binary or ternary split according to one of 4 split modes illustrated on FIG. 4. These split types are the vertical and horizontal binary split modes, noted SBTV and SBTH and the vertical and horizontal ternary split modes SPTTV and STTH.

The leaves of the coding tree of a CTU are CU in the case of a joint coding tree shared by luma and chroma components.

Contrary to HEVC, in VVC, in most cases, CU, PU and TU have equal size, which means coding units are generally not partitioned into PU or TU, except in some specific coding modes.

Figure 5:
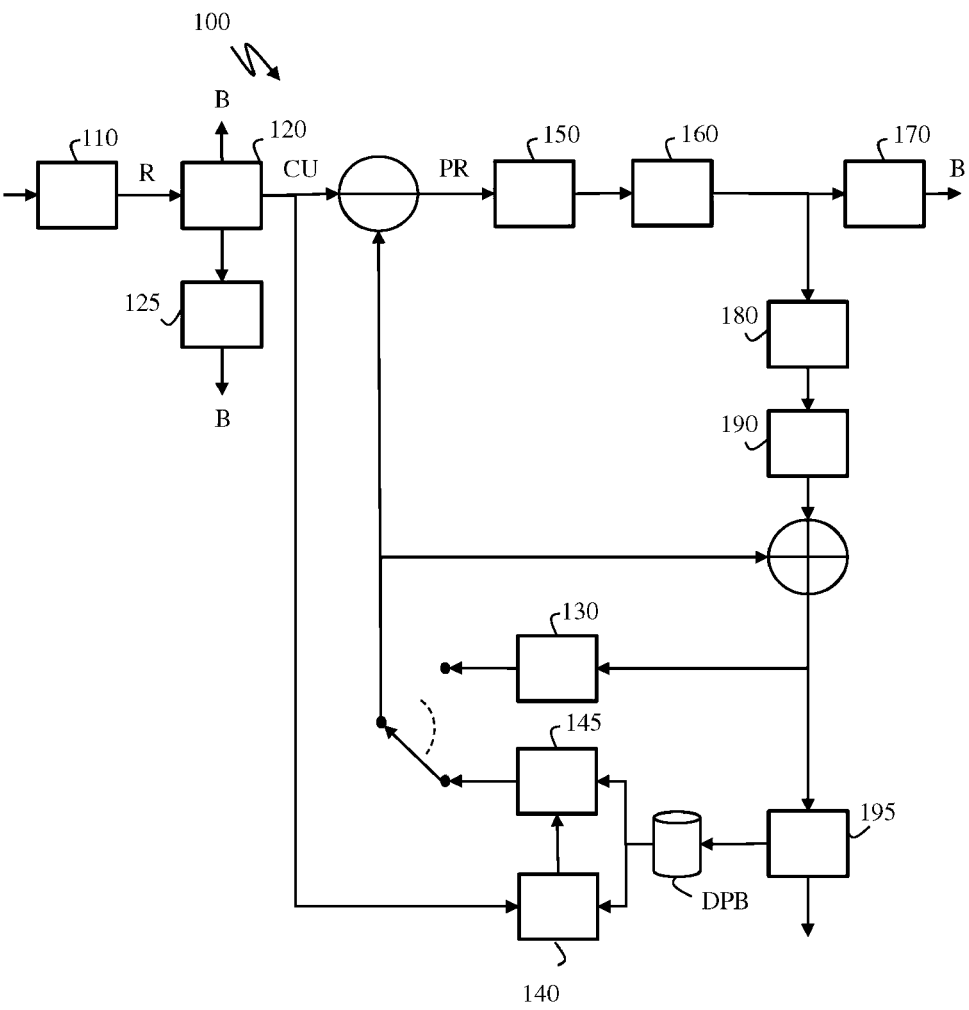
FIG. 5 shows a schematic block diagram of steps of a method 100 of encoding a video picture VP in accordance with prior art.
Figure 6:
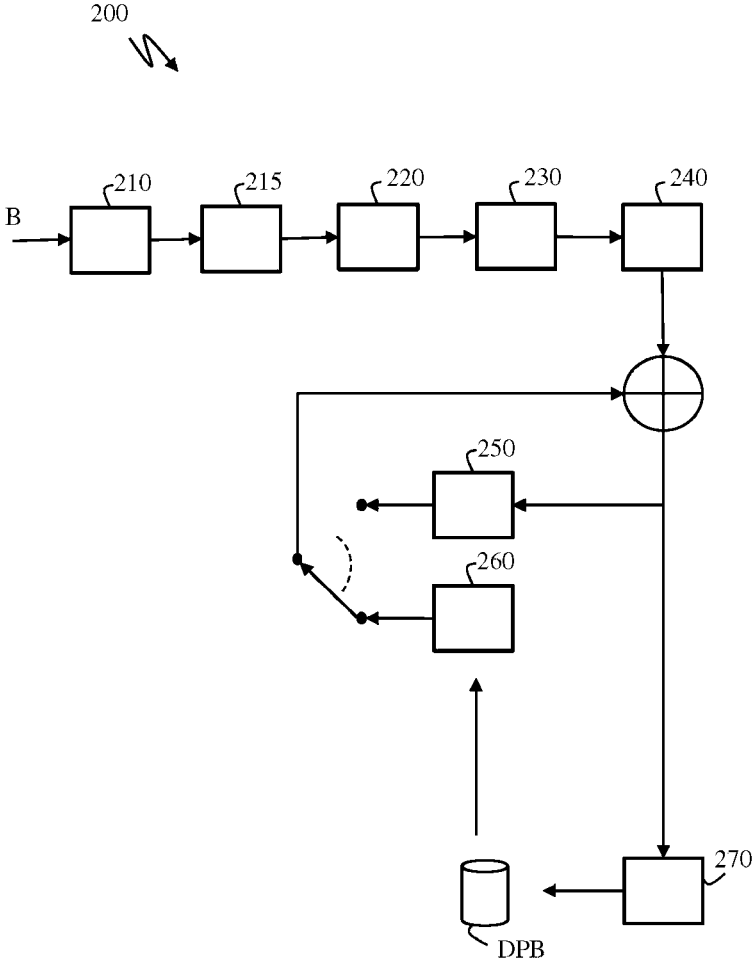
FIG. 6 shows a schematic block diagram of steps of a method 200 of decoding a video picture VP in accordance with prior art.

FIGS. 5 and 6 provide an overview of video encoding/decoding methods used in current video standard compression systems like HEVC or VVC for example.

FIG. 5 shows a schematic block diagram of steps of a method 100 of encoding a video picture VP in accordance with prior art.

In step 110, a video picture VP is partitioned into blocks of samples and partitioning information data is signaled into a bitstream. Each block comprises samples of one component of the video picture VP. The blocks thus comprise samples of each component defining the video picture VP.

For example, in HEVC, a picture is divided into Coding Tree Units (CTU). Each CTU may be further subdivided using a quad-tree division, where each leaf of the quad-tree is denoted a Coding Unit (CU). The partitioning information data may then comprise data describing the CTU and the quad-tree subdivision of each CTU.

Each block of samples, in short block, may then be either a CU (if the CU comprises a single PU) or a PU of a CU.

Each block is encoded along an encoding loop also called "in loop" using either an intra or inter prediction mode.

Intra prediction (step 120) used intra prediction data. Intra prediction consists in predicting a current block by means of an intra-prediction block based on already encoded, decoded and reconstructed samples located around the current block, typically on the top and on the left of the current block. Intra prediction is performed in the spatial domain.

In inter-prediction mode, motion estimation (step 130) and motion compensation (135) are performed. Motion estimation searches, in one or more reference picture(s) used to predictively encode the current video picture, a reference block that is a good predictor of the current block. In uni-directional motion estimation/compensation, a candidate reference block belongs to a single reference picture of a reference picture list denoted L0 or L1, and in bi-directional motion estimation/compensation, the candidate reference block is derived from a reference block of the reference picture list L0 and a reference block of the reference picture list L1.

For instance, a good predictor of the current block is a candidate reference block which is similar to the current block. It may also correspond to a reference block that provides a good trade-off between its similarity to current bock, and the rate cost of motion information needed to indicate its use for the temporal prediction of current block.

The output of the motion estimation step 130 is inter-prediction data comprising motion information associated to the current block and other information used for obtaining a same prediction block at the encoding/decoding side. Typically motion information comprises one motion vector and a reference picture index for uni-directional estimation/compensation and two motion vectors and two reference picture indices for bi-direction estimation/compensation). Next, motion compensation (step 135) obtains a prediction block by means of the motion vector(s) and reference picture index (indices) determined by the motion estimation step 130. Basically, the reference block belonging to a selected reference picture and pointed to by a motion vector may be used as the prediction block of the current block. Furthermore, since motion vectors are expressed in fractions of integer pixel positions (which is known as sub-pel accuracy motion vector representation), motion compensation generally involves a spatial interpolation of some reconstructed samples of the reference picture to compute the prediction block.

Prediction information data is signaled into the bitstream. The prediction information may comprise prediction mode (intra or inter or skip), intra/inter prediction data and any other information used for obtaining a same prediction block at the decoding side.

The method 100 selects one prediction mode (the intra or inter prediction mode) by optimizing a rate-distortion trade-off taking into account the encoding of a prediction residual block calculated, for example, by subtracting a candidate prediction block from the current block, and the signaling of prediction information data required for determining said candidate prediction block at the decoding side.

Usually, the best prediction mode is given as being the prediction mode of a best coding mode p* for a current block given by:

$$p^* = \operatorname*{Arg\,min}_{p \in P} \{RD_{cost}(p)\} \quad (1)$$

where P is the set of all candidate coding modes for the current block, p represents a candidate coding mode in that set, $RD_{cost}(p)$ is a rate-distortion cost of candidate coding mode p, typically expressed as:

$$RD_{cost(p)} = D(p) + \lambda.R(p)$$

D(p) is the distortion between the current block and a reconstructed block obtained after encoding/decoding the current block with the candidate coding mode p, R(p) is a rate cost associated with the coding of the current block with coding mode p, and $\lambda$ is the Lagrange parameter representing the rate constraint for coding the current block and typically computed from a quantization parameter used for encoding the current block.

The current block is usually encoded from a prediction residual block PR. More precisely, a prediction residual block PR is calculated, for example, by subtracting the best prediction block from the current block. The prediction residual block PR is then transformed (step 140) by using, for example, a DCT (discrete cosine transform) or DST (Discrete Sinus transform) type transform, or any other appropriate transform, and the obtained transformed coefficient block is quantized (step 150).

In variant, the method 100 may also skip the transform step 140 and apply quantization (step 150) directly to the prediction residual block PR, according to the so-called transform-skip coding mode.

Quantized transform coefficient block (or quantized prediction residual block) is entropy encoded into the bitstream (step 160).

Next, the quantized transform coefficient block (or quantized residual block) is de-quantized (step 170) and inverse transformed (180) (or not) as part of the encoding loop, leading to a decoded prediction residual block. The decoded prediction residual block and the prediction block are then combined, typically summed, which provides the reconstructed block.

Other information data may also be entropy encoded in step 160 for encoding a current block of the video picture VP.

In-loop filters (step 190) may be applied to a reconstructed picture (comprising reconstructed blocks) to reduce compression artefacts. Loop filters may apply after all picture blocks are reconstructed. For instance, they consist in deblocking filter, Sample Adaptive Offset (SAO) or adaptive loop filter.

The reconstructed blocks or the filtered reconstructed blocks form a reference picture that may be stored into a decoded picture buffer (DPB) so that it can be used as a reference picture for the encoding of a next current block of the video picture VP, or of a next vide picture to encode.

FIG. 6 shows a schematic block diagram of steps of a method 200 of decoding a video picture VP in accordance with prior art.

In step 210, partitioning information data, prediction information data and quantized transform coefficient block (or quantized residual block) are obtained by entropy decoding a bitstream of encoded video picture data. For instance, this bitstream has been generated in accordance with the method 100.

Other information data may also be entropy decoded for decoding from the bitstream a current block of the video picture VP.

In step 220, a reconstructed picture is divided into current blocks based on the partitioning information. Each current block is entropy decoded from the bitstream along a decoding loop also called "in loop". Each decoded current block is either a quantized transform coefficient block or quantized prediction residual block.

In step 230, the current block is de-quantized and possibly inverse transformed (step 240), to obtain a decoded prediction residual block.

On the other hand, the prediction information data is used to predict the current block. A prediction block is obtained through its intra prediction (step 250) or its motion-compensated temporal prediction (step 260). The prediction process performed at the decoding side is identical to that of the encoding side.

Next, the decoded prediction residual block and the prediction block are then combined, typically summed, which provides a reconstructed block.

In step 270, in-loop filters may apply to a reconstructed picture (comprising reconstructed blocks) and the reconstructed blocks or the filtered reconstructed blocks form a reference picture that may be stored into a decoded picture buffer (DPB) as above discussed (FIG. 5).

In VVC, motion information is stored per 4×4 blocks in each video picture. This means once a reference picture is stored in the decoded picture buffer (DPB, FIG. 5 or 6), motion vectors and reference pictures indices used for the temporal prediction of video picture blocks are stored on a 4×4 block basis. They can serve as temporal prediction of motion information for encoding/decoding a subsequent inter-prediction video picture.

Figure 7:
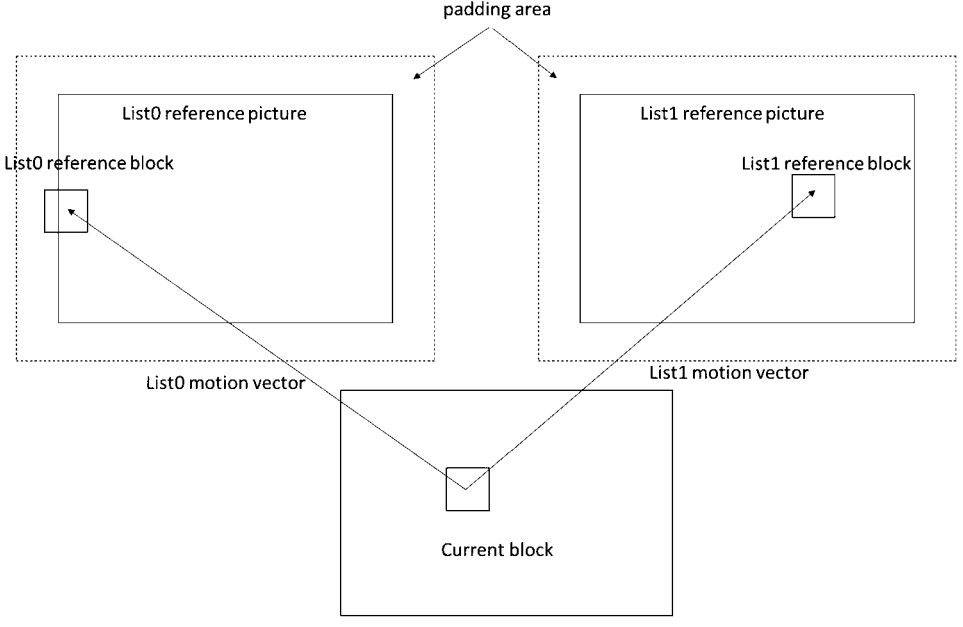
FIG. 7 shows an example of a bi-directional motion-compensated prediction in accordance with prior art.

In VVC, a temporal prediction of a current block may be based on a reference block of a reference picture that may overlap a boundary of said reference picture. For example, FIG. 7 shows an example of a bi-directional motion-compensated prediction of a current block based on a first reference block of a reference picture list L0 and a second reference block of a reference picture list L1. The first (respectively second) reference block is pointed to by a first (respectively second), motion vector. In the example of FIG. 7, a first reference block is partly outside the reference picture of the reference picture list L0, and a second reference block is inside the reference picture of the reference picture list L1. More generally, a reference block of one of the two reference pictures or the two reference blocks of these two reference pictures can partly or entirely lie outside reference picture boundaries.

Figure 8:
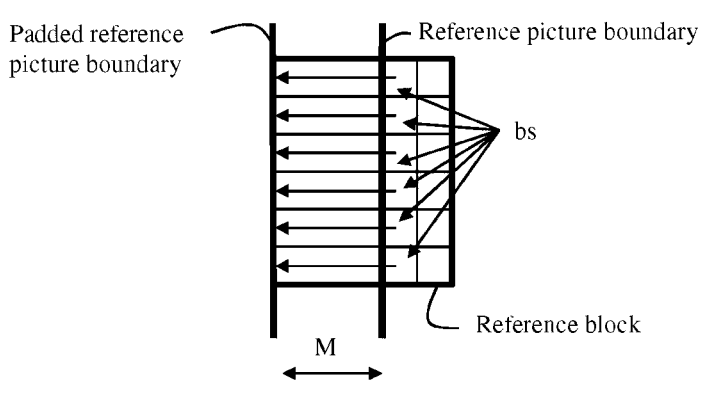
FIG. 8 shows a padding method in accordance with prior art.

In VVC, to handle such situations, reference pictures are extended through a simple padding method that consists in a perpendicular padding of the video picture boundary samples bs as illustrated on FIG. 8. This consists in simply repeating boundary sample value bs along a row or column of samples perpendicular to the reference picture boundary, beyond this boundary. The reference picture is extended along each of its boundary by extensions of M samples.

In prior art, inter- or intra-prediction-based padding methods improve the basic padding of FIG. 8.

Figure 9:
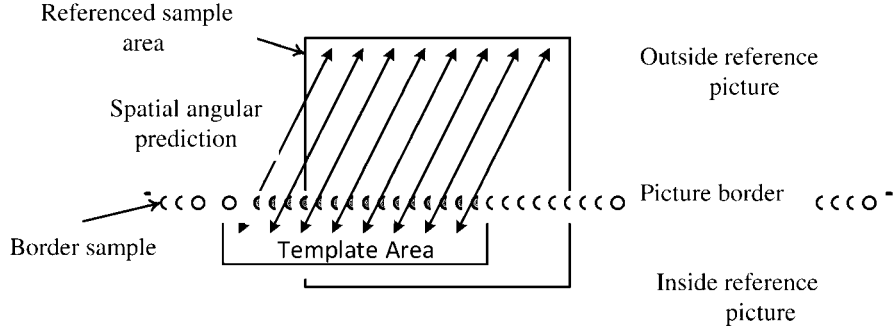
FIG. 9 shows an intra-prediction-based padding method in accordance with prior art.

An intra-prediction-based padding method is described in section 2.1.7.5 of the JVET contribution JVET-J0014 ("Description of SDR, HDR and 360° video coding technology proposal by Fraunhofer HHI", Joint Video Exploration Team (JVET) of ITU-T SG 16 WP 3 and ISO/IEC JTC 1/SC 29/WG 11, 10th Meeting: San Diego, US, 10-20 Apr. 2018, Document JVET-J0014). Basically, multi-directional boundary padding (MDBP) uses angular intra prediction to extend the reference picture border, whenever the referenced sample area is partially or entirely outside the area of a reference picture. The best intra mode is estimated in both encoder and decoder by using a template area that is located inside the reconstructed reference picture as shown on FIG. 9. The template area is filled by using all available intra coding modes revered and deriving sample values of the template area by intra prediction from the outer-most pixel line. The best intra coding mode leads to minimal SAD with respect to the original reconstructed sample values.

A first inter-prediction-based padding method is described in section 3.1 of the JVET contribution JVET-J0021 ("Description of SDR, HDR and 360° video coding technology proposal by Qualcomm and Technicolor-low and high complexity versions", Joint Video Exploration Team (JVET) of ITU-T SG 16 WP 3 and ISO/IEC JTC 1/SC 29/WG 11, 10th Meeting: San Diego, US, 10-20 Apr. 2018, Document "https://jvet-experts.org/doc_end_user/documents/ 10_San%20Diego/wg11/JVET-J0021-v5.zip"). Basically, as illustrated on FIG. 10, when the decoder performs motion compensation, if a motion vector MV1 associated with a block CB of a current video picture points to a block RB at least partly outside boundaries of a reference picture 1, a region Z of the reference block RB is not available. As illustrated on FIG. 11, the padding region around is split into one sub-regions SZ with size 4×M or M×4 and a second sub-region PZ of size 4×(P–Z), where P is the size of the full padding area. For each sub-region SZ along a boundary of the reference picture, a motion vector MV2 is derived from the nearest 4×4 subblock NB inside the reference picture 1 and a 4×4 subblock of a reference picture 2. If the nearest 4×4 subblock NB is intra-coded (intra-predicted), a zero-motion vector MV2 is used. If the nearest 4×4 subblock NB is coded (predicted) with bi-directional inter-prediction, only the motion vector, which points to the samples farther away from the boundary of its reference picture, is used in motion compensation for padding. After the motion vector derivation, motion compensation is then performed using the selected motion vector MV2 and the reference picture 2 to obtain the samples in the padding sub-region SZ with the consideration of average sample value offset between the nearest 4×4 subblock and its corresponding block in the reference picture 2. Note the size M of the inter-prediction-based extended region results from the value of the motion vector MV2 and is related to the distance between the picture boundary and the position pointed to by the motion vector MV2, see FIG. 11. Furthermore, the size M may be smaller than the full padding size P of the reference picture. In such case, the inter-prediction-based padding is further completed by the basic perpendicular padding of VVC. This means the area padded by inter-prediction, is extended through the basic perpendicular padding mentioned above with reference to VVC.

Figure 12:
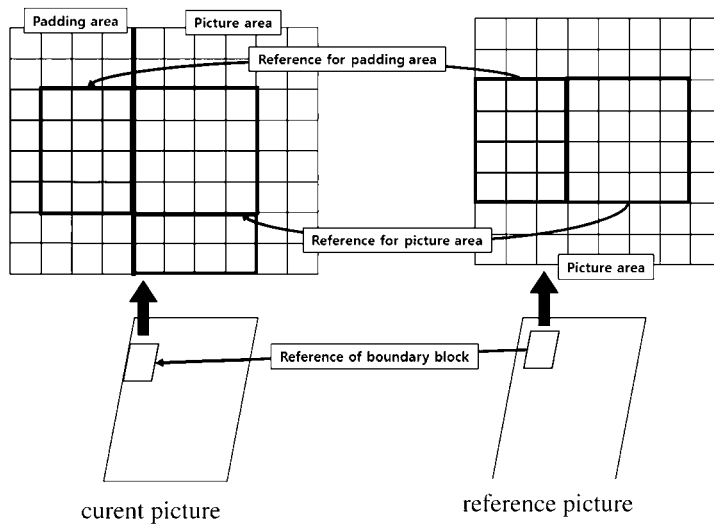
FIG. 12 shows an example of a second inter-prediction-based padding method in accordance with prior art.

A second inter-prediction-based padding method is described in section 2.1.7.5 of the JVET contribution JVET-J0025 ("Description of SDR, HDR and 360° video coding technology proposal by Huawei, GoPro, HiSilicon, and Samsung—general disclosure scenario", Joint Video Exploration Team (JVET) of ITU-T SG 16 WP 3 and ISO/IEC JTC 1/SC 29/WG 11, 10th Meeting: San Diego, US, 10-20 Apr. 2018, Document https://jvet-experts.org/doc_end_user/ documents/10_San%20Diego/wg11/JVET-J0025-v4.zip). Basically, if a boundary sample of a video picture is derived by a motion compensation, padded sample is also derived by using said motion compensation as illustrated on FIG. 12. For using neighbor sample of reference block, motion compensation of the area which is referenced by padded sample is conducted. If the area is smaller than padded area or boundary block is not derived by motion compensation, left padded sample is derived using last samples. Top-left, top-right, bottom-left, bottom-right of padding area are derived by using last sample of each position. This method is conducted after in-loop filtering.

A third inter-prediction method handling out of boundaries reference blocks is described in section 2.1.7.5 of the JVET contribution JVET-Y0125 ("AHG12: Enhanced bi-directional motion compensation", Yi-Wen Chen, Che-Wei Kuo, Ning Yan, Wei Chen, Xiaoyu Xiu, Xianglin Wang, Joint Video Experts Team (JVET) of ITU-T SG 16 WP 3 and ISO/IEC JTC 1/SC 29 25th Meeting, by teleconference, 12-21 Jan. 2022, Document JVET-Y0125). Basically, to avoid prediction (motion-compensated prediction) blocks b be at least partly out of the reference picture boundaries which are less effective, when combining more than one motion-compensated prediction blocks, the OOB (out-of-boundaries) prediction samples of a prediction block b are discarded and only the non-OOB (in-boundaries) prediction samples are used to generate the final prediction block. More precisely, let ($Pos\_x_{i,j}$, $Pos\_y_{i,j}$) be the cartesian coordinates of a sample position (i,j) within current block. Let ($Mv\_x_{i,j}^{Lx}$, $Mv\_y_{i,j}^{Lx}$) be the cartesian coordinates of motion vector (MV) associated with the sample position (i,j) within current block (Lx indicates if the reference picture belongs to the reference picture list L0 (x=0) or to the reference picture list L1 (x=1). Let $Pos_{LeftBdry}$, $Pos_{RightBdry}$, $Pos_{TopBdry}$, $Pos_{BottomBdry}$ be cartesian coordinates of the 4 reference picture boundaries.

A prediction sample $$P_{i,j}^{Lx}$$

for sample position (i,j) of a prediction block $$P_{\square}^{Lx}$$

is regarded as OOB when at least one of the following conditions holds $$\left(\text{Pos\_x}_{i,j} + \text{Mv\_x}_{i,j}^{Lx}\right) > \left(Pos_{RightBdry} + \text{half\_sample}\right),$$

$$\left(\text{Pos\_x}_{i,j} + \text{Mv\_x}_{i,j}^{Lx}\right) < \left(Pos_{LeftBdry} - \text{half\_sample}\right),$$

$$\left(\text{Pos\_y}_{i,j} + \text{Mv\_y}_{i,j}^{Lx}\right) > \left(Pos_{BottomBdry} + \text{half\_sample}\right), \text{ or}$$

$$\left(\text{Pos\_y}_{i,j} + \text{Mv\_y}_{i,j}^{Lx}\right) > \left(Pos_{TopBdry} - \text{half\_sample}\right)$$

When none of the above conditions holds, the prediction sample $$P_{i,j}^{Lx}$$

is regarded as non-OOB. Here, half_sample represents half the distance between two neighboring luma sample, according to the codec's MV internal representation accuracy (1/16-pel for VVC). Otherwise, the prediction sample $$P_{i,j}^{Lx}$$

is regarded as OOB. A prediction block $$P_{\square}^{Lx}$$

is then regarded as OOB if at least one of its samples is OOB and is regarded as non-OOB when all its samples are non-OOB. Here, half_sample represents half the distance between 2 samples, according to the codec's MV internal representation accuracy (1/16-pel for VVC).

Next, if the prediction sample $$P_{i,j}^{L0}$$

is OOB and the prediction sample $$P_{i,j}^{L1}$$

is non-OOB, then the final prediction sample $$P_{i,j}^{final}$$

equals the prediction sample $$P_{i,j}^{L1}.$$

Else, if the prediction sample $$P_{i,j}^{L0}$$

is non-OOB and the prediction sample $$P_{i,j}^{L1}$$

is OOB, then the final prediction sample $$P_{i,j}^{final}$$

equals the prediction sample $$P_{i,j}^{L0}.$$

Else, the final prediction sample $$P_{i,j}^{final}$$

is given by a weighted average of the two prediction sample $$P_{i,j}^{L0} \text{ and } P_{i,j}^{L1}.$$

This weighted average is typically the mean value, thus using weight 1/2 and 1/2).

The limitation of the third inter-prediction-based padding method is that it does not handle the case of uni-directionally prediction block in which a MV points to an OOB reference block. Also, it does not improve the bi-directional motion compensation method of VVC when all the prediction blocks associated with references picture belonging to both reference picture lists L0 and L1 are OOB.

There is room to improve the out-of-boundaries prediction blocks management method proposed in JVET-Y0125.

The problem solved by the present invention is to further increase the compression of existing video coding standards like HEVC or VVC.

In particular, the problem solved is to improve the efficiency of motion compensated temporal prediction in the case where some motion vector points to a reference block outside a boundary of a reference picture.

At least one of the aspects generally relates to video picture encoding and decoding, one other aspect generally relates to transmitting a bitstream provided or encoded and one other aspects relates to receiving/accessing a decoded bitstream.

At least one of the exemplary embodiments is described for encoding/decoding a video picture but extends to the encoding/decoding of video pictures (sequences of pictures) because each video picture is sequentially encoded/decoded as described below.

Moreover, the at least one exemplary embodiments are not limited to MPEG standards such as AVC (ISO/IEC 14496-10 Advanced Video Coding for generic audio-visual services, ITU-T Recommendation H.264, https://www.itu-.int/rec/T-REC-H.264-202108-P/en), EVC (ISO/IEC 23094-1 Essential video coding), HEVC (ISO/IEC 23008-2 High Efficiency Video Coding, ITU-T Recommendation H.265, https://www.itu.int/rec/T-REC-H.265-202108-P/en, VVC (ISO/IEC 23090-3 Versatile Video Coding, ITU-T Recommendation H.266, https://www.itu.int/rec/T-REC-H.266-202008-I/en but may be applied to other standards and recommendations such as AV1 (AOMedia Video 1, http://aomedia.org/av1/specification/) for example. The at least one exemplary embodiment may apply to pre-existing or future-developed, and extensions of any such standards and recommendations. Unless indicated otherwise, or technically precluded, the aspects described in the present disclosure may be used individually or in combination.

A pixel corresponds to the smallest display unit on a screen, which can be composed of one or more sources of light (1 for monochrome screen or 3 or more for colour screens).

A video picture, also denoted frame or picture frame, comprises at least one component (also called picture component, or channel) determined by a specific picture/video format which specifies all information relative to pixel values and all information which may be used by a display unit and/or any other device to display and/or to decode video picture data related to said video picture.

A video picture comprises at least one component usually expressed in the shape of an array of samples.

A monochrome video picture comprises a single component and a color video picture may comprise three components.

For example, a color video picture may comprise a luma (or luminance) component and two chroma components when the picture/video format is the well-known (Y,Cb,Cr) format or may comprise three color components (one for Red, one for Green and one for Blue) when the picture/video format is the well-known (R,G,B) format.

Each component of a video picture may comprise a number of samples relative to a number of pixels of a screen on which the video picture is intended to be display. In variants, the number of samples comprises in a component may be a multiple (or fraction) of a number of samples comprised in another component of a same video picture.

For example, in the case of a video format comprising a luma component and two chroma component like the (Y,Cb, Cr) format, dependent on the color format considered, the chroma component may contain half the number of samples in width and/or height, relative to the luma component.

A sample is the smallest visual information unit of a component composing a video picture. A sample value may be, for example a luma or chroma value or a colour value of a (R, G, B) format.

A pixel value is the value of a pixel of a screen. A pixel value may be represented by one sample for monochrome video picture and by multiple co-located samples for color video picture. Co-located samples associated with a pixel mean samples corresponding to the location of a pixel in the screen.

It is common to consider a video picture as being a set of pixel values, each pixel being represented by at least one sample.

A block of a video picture is a set of samples of one component of the video picture. A block of at least one luma sample or a block of at least one chroma sample may be considered when the picture/video format is the well-known (Y,Cb,Cr) format, or a block of at least one color sample when the picture/video format is the well-known (R, G, B) format.

The at least one exemplary embodiment is not limited to a particular picture/video format.

Generally speaking, the present disclosure relates encoding/decoding a video picture into a bitstream of encoded video picture data comprising temporal predicting a video picture block by obtaining a temporal predicted block based on at least one reference block of at least one reference picture pointed to by at least one motion vector associated with the video picture block, wherein If the temporal prediction of the video picture block is based on a single reference block of a reference picture, then the method further comprises padding (302) the reference block based on a motion vector derived from a nearest subblock of the current block inside the video picture.

The present invention improves the third inter-prediction prior art method discussed above because it provides an improved padded texture area for a reference block part out of the reference picture boundaries in the case of uni-directional temporal prediction of a current video picture block.

Padding may apply both on the encoding method 100 or the decoding method 200 to extend reference pictures which are stored in the DPB.

Figure 13:
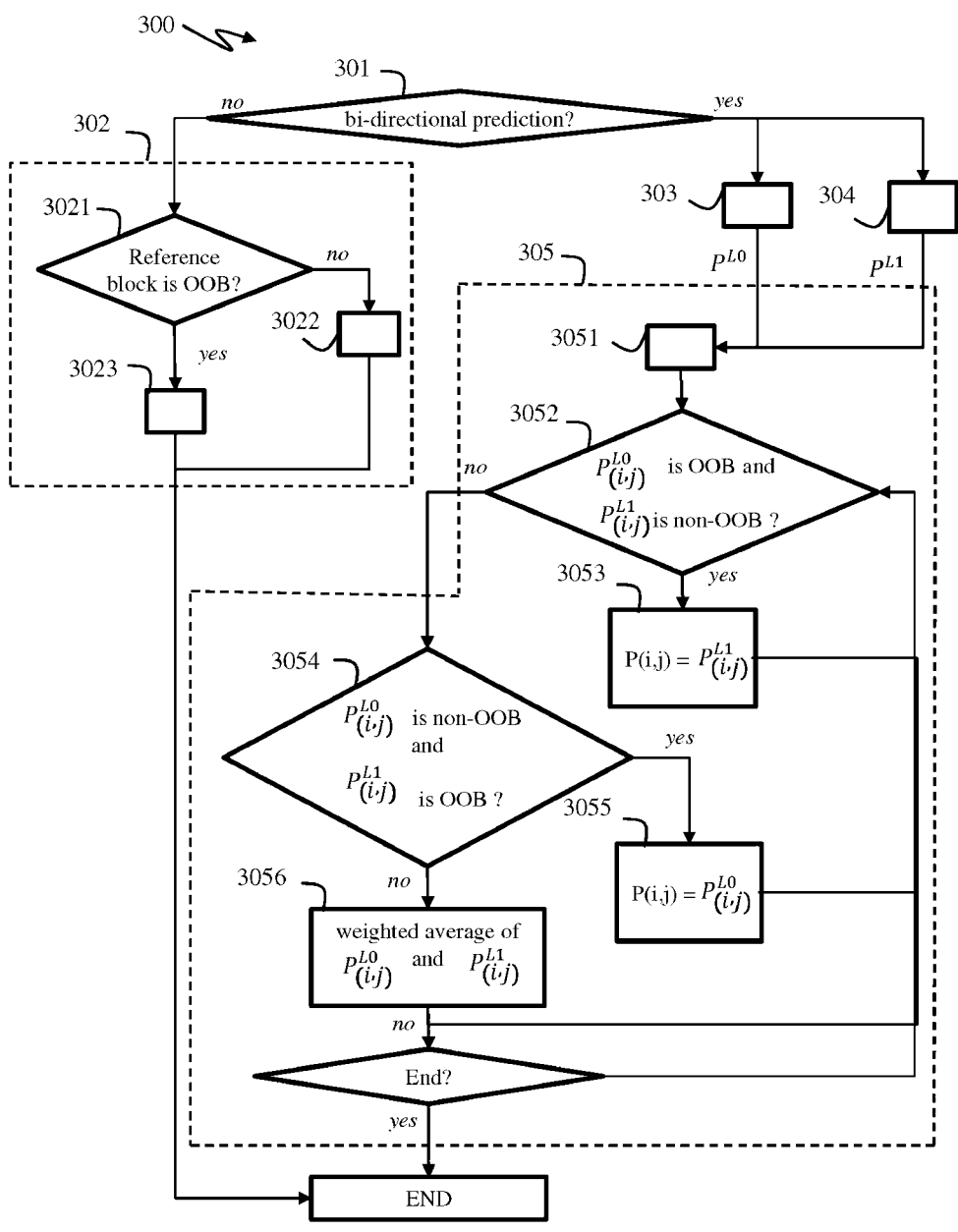
FIG. 13 shows schematically a block diagram of a method 300 of motion compensated prediction in accordance with at least one exemplary embodiment.

FIG. 13 shows schematically a block diagram of a method 300 of motion compensated prediction in accordance with at least one exemplary embodiment;

For a current block (PU of a current CU) of a video picture to be inter-prediction, in step 301, the method 300 checks if a bi-directional motion-compensated prediction is used.

If a uni-directional motion-compensated prediction is used for the current block, i.e. if a motion-compensated prediction of a current block is based on a single reference block of a reference picture, in step 302, the reference block is padded based on a motion vector derived from a nearest subblock of the current block inside the video picture as discussed above in relation with FIGS. 10 and 11. The well-known uni-directional motion-compensated prediction is performed for example as defined in section 8.5.6.3 of VVC specification, based on the reference picture that may be padded.

Step 302 is performed for reference blocks which are non-OOB reference blocks and for OOB reference blocks. For non-OOB reference blocks, the motion-compensated prediction of the current block leads to the same result as in VVC, since all samples of the reference block are inside the single reference picture boundaries.

Figure 10:
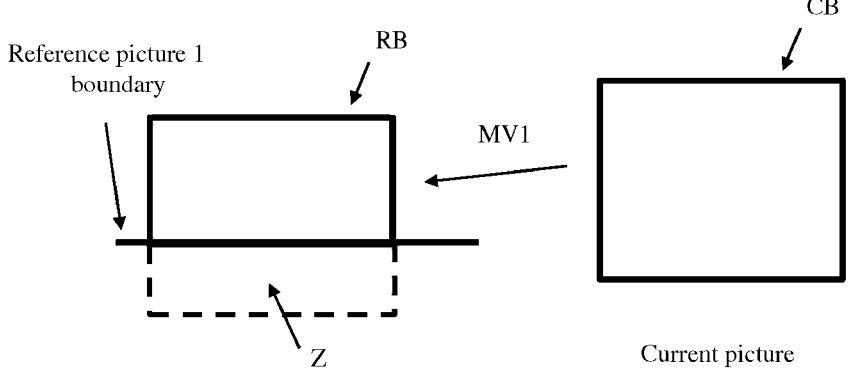
FIGS. 10 and 11 show an example of a first inter-prediction-based padding method in accordance with prior art.
Figure 11:
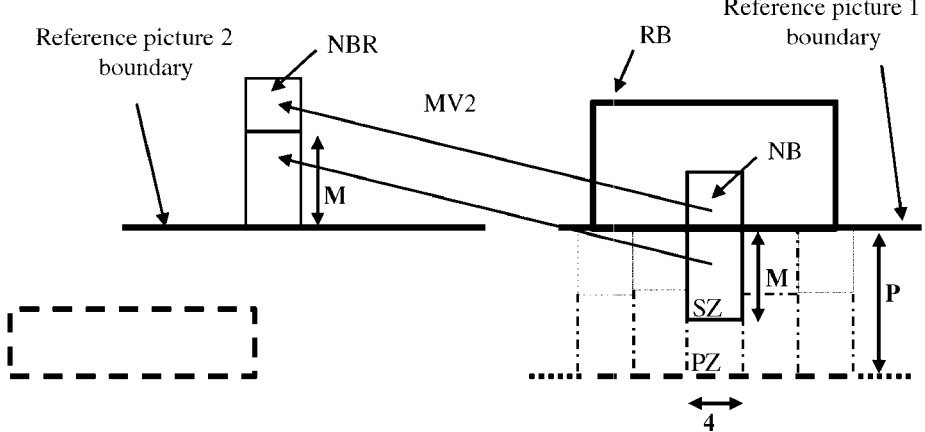

Step 302 is advantageous for OOB reference blocks, i.e. for prediction block having at least one OOB prediction sample, because the samples of those reference blocks used for motion-compensated prediction are those generated by the inter-prediction-based padding method as discussed in relation with FIGS. 10 and 11. That is, these samples of OOB reference blocks which are outside of the reference picture boundaries are generated through a motion-compensated prediction, which uses the stored motion vector associated with the 4×4 subblock inside the single reference picture, which is closest to the considered samples of the reference block as discussed above. Thus, these motion-compensated prediction reference samples are of better quality than samples obtained by the VVC perpendicular padding method.

In a variant of step 302, in step 3021 the method 300 checks if the reference block (pointed to by a motion vector associated to the current block) is OOB, i.e. if at least one sample of the reference block is out of a single reference picture boundary.

If the single reference block is non-OOB (i.e. all samples of the single reference block are inside the reference picture boundaries), in step 3022, a well-known uni-directional motion-compensated prediction is performed for example as defined in VVC based on the reference picture.

If the single reference block is OOB, then in step 3023 the single reference block is padded based on a motion vector derived from a nearest subblock of the current block inside the video picture as discussed above in relation with FIGS. 10 and 11, and a well-known uni-directional motion-compensated prediction is performed for example as defined in VVC based on the padded reference picture.

According to the variant of step 302, only OOB reference blocks are padded based on a motion vector derived from nearest subblocks of the current block inside the video picture.

This variant avoids padding of non-OOB reference blocks and thus limit the computing complexity compared to the case where all the reference blocks are padded independently of whether they are non-OOB or OOB.

If a bi-directional motion-compensated prediction is used for the current block (step 301), steps 303-305 are performed.

In step 303, a first prediction block $P^{L0}$ of the current block is obtained based on a first reference block of a reference picture of a reference picture list, for example L0, using a well-known uni-directional motion-compensated prediction for example as defined in VVC. If the first reference block is non-OOB, the well-known uni-directional motion-compensated prediction is based on the first reference block. If the first reference block is OOB, then the first reference block is padded based on a motion vector derived from a 4×4 nearest subblock of the current block inside the video picture as discussed above in relation with FIGS. 10 and 11, and the well-known uni-directional motion-compensated prediction based on the first padded reference block.

In step 304, a second prediction block $P^{L1}$ of the current block is obtained based on a second reference block of a reference picture of another reference picture list, for example L1, using a well-known uni-directional motion-compensated prediction for example as defined in VVC. If the second reference block is non-OOB, the well-known uni-directional motion-compensated prediction is based on the second reference block. If the second reference block is OOB, then the second reference block is padded based on a motion vector derived from a nearest 4×4 subblock of the current block inside the video picture as discussed above in relation with FIGS. 10 and 11, and the well-known uni-directional motion-compensated prediction is based on the second padded reference block.

Alternatively, at step 303 and 304, an inter-prediction-based padding method of the first and second reference blocks may be applied only if the first and second reference blocks, respectively associated to reference picture lists L0 and L1, are regarded as OOB. On the contrary, if at least one of the first and second reference blocks is regarded non-OOB, then no inter-prediction-based padding method would take place for the first and second reference blocks.

The advantage of this alternative is a reduced complexity compared to the other method above, because it avoids performing inter-prediction-based padding in many cases, i.e. case where at least one reference block for bi-prediction is non-OOB.

In step 305, a final motion-compensated prediction block is obtained by averaging the first and second prediction blocks on a sample basis according to whether a sample $$P^{L0}_{(i,j)}$$

at a given position (i,j) of the first prediction block $P^{L0}$ is OOB or not and according to whether a sample $$P^{L1}_{(i,j)}$$

at the same position (i,j) of the second prediction block $P^{L1}$ is OOB or not.

In one exemplary embodiment of steps 305, sub-steps 3051-3056 may be performed for each sample position (i,j) of the current block.

In sub-step 3051, a first sample position (i,j) of the current block is considered.

In sub-step 3052, the method 300 checks whether the prediction sample $$P^{L0}_{(i,j)}$$

at a current position (i,j) of the first prediction block is OOB and whether the prediction sample $$P^{L1}_{(i,j)}$$

at the current position (i,j) of the second prediction block is non-OOB. If the prediction sample $$P^{L0}_{(i,j)}$$

is OOB and the prediction sample $$P^{L1}_{(i,j)}$$

is non-OOB, sub-step 3052 is followed by sub-step 3053. If either the prediction sample $$P^{L0}_{(i,j)}$$

is non-OOB or the prediction sample $$P^{L1}_{(i,j)}$$

is OOB, then sub-step 3052 is followed by sub-step 3054.

In step 3053, the prediction sample at the current position (i,j) of the final prediction block P is set equal to the prediction sample at the current position (i,j) of the first prediction block $$P^{L1}_{(i,j)}.$$

In sub-step 3054, the method 300 checks whether the prediction sample $$P^{L0}_{(i,j)}$$

at the current position (i,j) of the first prediction block is non-OOB and whether the prediction sample $$P^{L1}_{(i,j)}$$

at the current position (i,j) of the second prediction block is OOB. If the prediction sample $$P^{L1}_{(i,j)}$$

is non-OOB and the prediction sample $$P^{L0}_{(i,j)}$$

is OOB, sub-step 3054 is followed by sub-step 3055. If either the prediction sample $$P^{L0}_{(i,j)}$$

is OOB or the prediction sample $$P^{L1}_{(i,j)}$$

is non-OOB, then sub-step 3054 is followed by sub-step 3056.

In step 3055, the prediction sample at the current position (i,j) of the final prediction block P is set equal to the prediction sample at the current position (i,j) of the second prediction block $$P^{L1}_{(i,j)}.$$

In step 3056, the prediction sample at the current position (i,j) of the final prediction block P is set equal to a weighted average of the prediction samples at the current position (i,j) of the first and second prediction blocks.

After steps 3052, 3053 and 3056, the methods 300 checks if all positions of the current block have been considered. If not, a next position of the current block is considered and the methods iterates at sub-steps 3052. If all positions have been considered step 305 is terminated.

According to the exemplary embodiment of step 305, a prediction ample of the final prediction block may equal a uni-predicted sample of one of the first or second prediction block if said uni-predicted sample position is non-OOB and the other one is OOB and equals a weighted average of the two uni-predicted samples if both the first and second uni-predicted samples are non-OOB, or also if both are OOB. In this last case where both uni-predicted sample positions are OOB, the third prior art inter-prediction method suffers from using uni-predicted samples issued from the perpendicular padding method of the VVC specification, which may be of low quality.

Method 300 improves the third prior art inter-prediction method as discussed above for uni- and bi-directional motion-compensated prediction samples. For uni-directional motion-compensated prediction samples, the third prior art inter-prediction method does not propose any solution. For bi-directional motion-compensated prediction samples, the method 300 benefits from the usage of an improved padded area in out-of-boundaries reference picture areas as discussed above in relation with FIGS. 10 and 11.

As a consequence, the method 300 improves compression efficiency compared to usual motion-compensated prediction using padding of reference picture as discussed in relation with any intra- or inter-prediction-based padding method in prior art such as the first and second inter-prediction-based padding as discussed above. It also improved compression efficiency compared to the bi-directional inter-prediction method of the third prior art inter-prediction method.

In one exemplary embodiment, a prediction samples $$P^{L0}_{(i,j)} \text{ or } P^{L1}_{(i,j)}$$

may be considered OOB only when its position in a reference picture is beyond a temporally predicted area extending the reference picture. For example, a prediction sample is OOB when its position in the reference picture 1 of FIG. 11 is beyond the sub-area SZ.

Said exemplary embodiment is advantageous because the bi-directional motion-compensated prediction may benefit from a padded reference picture area of good quality, since it has been padded through motion compensation and not through a basic perpendicular padding (as zone PZ of FIG. 11). As a consequence, said exemplary embodiment provides a synergy between the first prior art inter-prediction-based padding method and the third prior art inter-prediction prior art method, because uni-direction and bi-directional motion-compensated prediction generally benefit from better quality prediction samples than in the prior art. The first inter-prediction-based padding method provides a good quality extension of reference pictures, the third prior art inter-prediction method provides good quality prediction samples for some bi-directional motion-compensated predictions, and combining these two methods according to said exemplary embodiment leads also to use more often the bi-directional motion-compensated prediction of the third prior art inter-prediction method and thus improves compression efficiency compared to a method in which a prediction sample is considered as OOB when its location is outside a boundary of a reference picture.

In one exemplary embodiment, a prediction sample $$P^{L0}_{i,j} \text{ or } P^{L1}_{i,j}$$

which position may be outside the reference frame boundaries is considered as non-OOB when it is derived though an inter-prediction process (as is the case for region SZ on FIG. 11) and as OOB when it is not derived from an inter-prediction process. Therefore, if the nearest 4×4 block to the considered sample has no motion vector, hence is intra-coded, the considered reference sample position is considered as OOB.

Thus, M×4 and 4×M sub-region (SZ on FIG. 11) may be marked as inter-coded during the reference picture extension process. This marked information is then used to decide if some prediction sample $$P_{i,j}^{L0} \text{ or } P_{i,j}^{L1}$$

is OOB or non-OOB.

This last exemplary embodiment provides a finer and more accurate way to ensure that bi-directional motion-compensated prediction benefits from extended reference picture part of good quality, leading to further improvement of compression efficiency of the current block.

Figure 14:
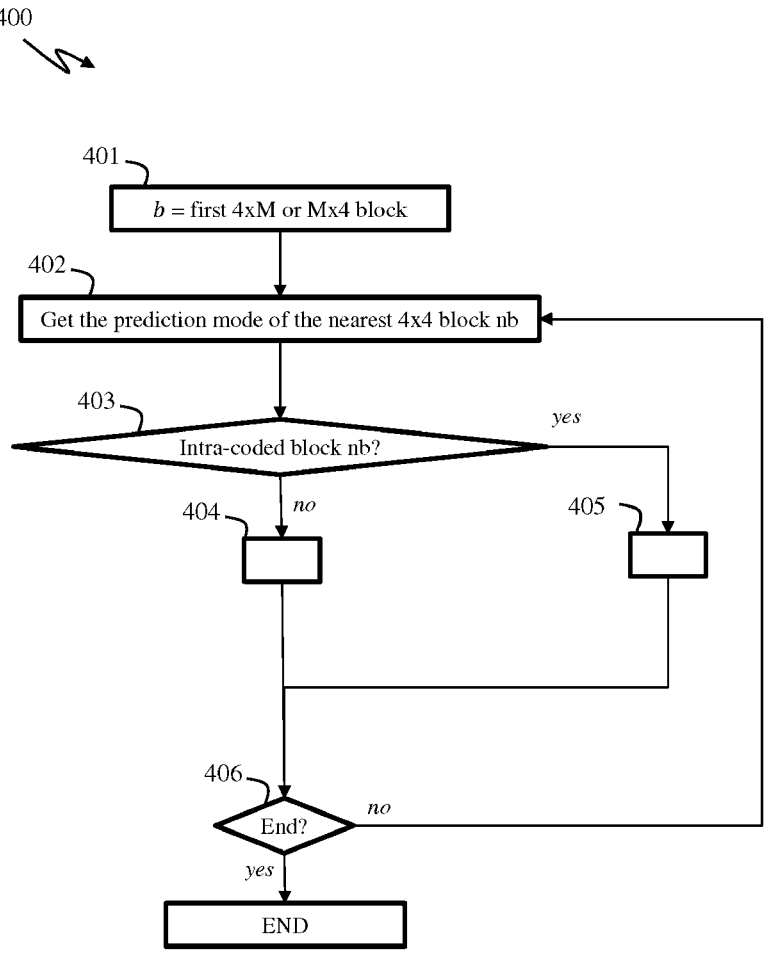
FIG. 14 shows schematically a block diagram of a method 400 of padding reference blocks of a reference picture in accordance with one exemplary embodiment.

In one exemplary embodiment, illustrated on FIG. 14, a reference block used for predicting a current block of a video picture may be padded from information associated with a 4×4 subblock inside the video picture which is either intra- or inter-coded.

In one exemplary embodiment, the size M of the inter-prediction-based extended region (see FIG. 11) may be adjusted as a function of some characteristics of the current video picture.

Indeed, if the current video picture has some reference pictures which have themselves been inter-predicted, it is likely that these reference pictures have good quality inter-prediction-based extended area around their boundaries, since these inter-prediction-based extended areas have been inter-predicted. The likeliness to have good inter-prediction-based extended areas thus increases as a function of the number of inter-coded pictures before the considered reference picture. This typically correlates to the temporal layer of the current video picture. Indeed, the temporal layer of a picture relates to the number of already coded and decoded reference pictures the current picture depends on with regards to the inter-prediction from picture to picture.

Therefore the size of the inter-prediction-based extended region may be decoded according to the following decision: if the temporal layer associated to a considered reference picture is at least equal to 2 and the at least two reference pictures are inter-coded pictures, then size M of inter-prediction-based extended region of the considered reference picture is increased to M+4. Otherwise, the size M of inter-prediction-based extended region of the considered reference picture is left equal to M.

In one exemplary embodiment, a distance threshold may be used to determine if a prediction sample of the first or second prediction block is OOB or not. Said distance threshold may be modified according to some characteristics of the reference pictures of the current video picture.

For instance, if a reference picture belongs to a temporal layer at least equal to a given value, say 2, then the distance threshold may be assigned a higher distance than the value half_sample used in the method of FIG. 13 (steps 3052 and 3054). For instance the distance threshold may be set to twice the distance between two neighboring luma samples, noted double_sample.

The selection of the distance threshold may follow the following decision process: If the temporal layer associated to the reference picture is at least equal to 2 and the at least two reference pictures of the considered reference pictures are inter-coded pictures, then the distance threshold is set equal to double_sample. Otherwise, the distance threshold is set equal to half_sample.

In a variant, the distance threshold is signaled in some header of the bitstream such as in a slice header, a picture header, a picture parameter set (PPS) or a sequence parameter set (SPS).

In one exemplary embodiment, the motion vector MV2 (FIG. 11) used for inter-predicting sub-region SZ may be refined after being taken from the nearest 4×4 subblock inside a reference picture. This refinement may conform to the known Template Matching (TM) motion refinement used in the ECM ("Algorithm description of Enhanced Compression Model 3 (ECM 3)", Muhammed Coban, Fabrice Le Léannec, Mohammed Golam Sarwer, Jacob Ström, Joint Video Experts Team (JVET) of ITU-T SG 16 WP 3 and ISO/IEC JTC 1/SC 29 23rd Meeting, by teleconference, 7-16 Jul. 2021, Document JVET-X2025). This may consist in searching a reference area around the area pointed to the considered motion vector MV2, by minimizing a template matching cost (typically a distortion, plus optionally a motion vector cost measure). The distortion calculated for the TM cost may be computed between the template region neighboring current sub-region SZ and a corresponding template area in the reference picture of current reference picture.

In one exemplary embodiment improving the first inter-prediction-based padding method of FIG. 10 and FIG. 11, the following correction of the inter-prediction may be applied.

In the existing prior art solution of FIG. 11, a correction is applied onto the inter-predicted sub-region SZ. This correction is an additive offset, calculated as the average difference between the 4×4 subblock NB and the 4×4 subblock NBR pointed by the motion vector MV2. This average difference is then applied to the predicted sub-region SZ.

In the present exemplary embodiment, this correction may be replaced by a linear model-based inter-prediction enhancement similar to the known Local Illumination Compensation of the ECM.

This takes the form of determining a linear model linking subblocks NB and NBR:

$$(a^*, b^*) = \text{Argmin}_{a,b} \{||NB - (a.NBR + b)||\}$$

Then the prediction of sub-region SZ is enhanced with the linear model parameters (a, b): $SZ_{final}=a \cdot SZ+b$.

The advantage of this exemplary embodiment is an increased quality of the sub-region SZ, through an enhanced temporal prediction.

In one exemplary embodiment, a decoded video picture may be extended according to the present invention just after decoding said video picture (both at encoder and decoder side).

This enable preparing the so-decoded video picture before it serves as a reference picture for a next video picture to encode or decode.

In a variant of the last exemplary embodiment, a decoded video picture may be extended according to the present invention just after decoding said video picture and before a next video picture is encoded/decoded.

In a variant of the last exemplary embodiment, a decoded video picture may be extended only if the video picture serves as a reference picture for future video picture encoding/decoding.

The decision to extend a decoded video picture is then taken during the construction or updating of the reference picture list during the coding and decoding method 100 and 200. At decoder side, after the header part of a video picture has been decoded, the decoder is able to know which video pictures are used as reference pictures for the current video picture. Thus, for each reference picture used, if it has not yet been extended, then it is being extended and marked as padded.

In a variant of this last exemplary embodiment, the decision to extend a video picture may be taken just after it has been encoded (encoder side) or decoded (decoder side).

For instance, a current video picture is being extended if the current video picture has all its reference picture in the past of current video picture in display order and if the temporal layer the current video picture is different from the maximum temporal layer in a considered video sequence, or if he current video picture is an Intra coded picture or an IRAP (Intra Random Access point) picture. Otherwise, the current picture is not extended. FIG. 14 shows schematically a block diagram of a method 400 of padding reference blocks of a reference picture in accordance with one exemplary embodiment.

Basically, each reference block located at the boundaries of the reference picture are considered iteratively and for each of the reference block a 4×M or M×4 block b is derived around the reference picture to obtain an extended reference picture as illustrated on FIG. 7 (padding area).

In step 401, a first 4×M or M×4 block b is considered for a current reference block.

In step 402, a 4×4 nearest subblock nb to the current block b inside the reference picture is determined and its coded (prediction) mode is obtained.

In step 403, the coded mode of the block nb is checked.

If the coded mode is an inter-coded mode, in step 404, the current reference block is padded based on a motion vector derived from the block nb as discussed above in relation with FIGS. 10 and 11.

If the coded mode is an intra-coded mode, in step 405, the current reference block is padded based on an intra-prediction-based padding method.

In a variant of step 405, the intra-prediction-based padding method may be the first intra-prediction-based padding method as discussed above in which the best intra mode is replaced by the obtained intra-coded mode.

In another variant of step 405, the intra-prediction-based padding method may be the first intra-prediction-based padding method as discussed above in which the best intra mode is replaced by a prediction mode similar to the DIMD (Decoder Intra Mode Derivation) of the ECM ("Algorithm description of Enhanced Compression Model 3 (ECM 3)", M. Coban, F. Le Léannec, M. Sarwer, J. Strom, Document JVET-X2025, Joint Video Experts Team (JVET) of ITU-T SG 16 WP 3 and ISO/IEC JTC 1/SC 29, 23rd Meeting, by teleconference, 7-16 Jul. 2021, https://jvet-experts.org/doc_end_user/current_document.php?id=11231). Basically, DIMD consists in computing a histogram of the spatial gradients of the 2D reconstructed signal in block nb and deriving an intra prediction mode based on this gradient-based analysis. The basic principle is to extend the directions contained in the reconstructed intra signal to the OOB samples of the current reference block.

In step 406, the method 400 checks whether all the reference blocks along boundaries of the reference picture have been considered. If yes, the method is terminated. Otherwise a new reference block is considered and the method iterates on step 402.

The method 400 further improves quality of the extended reference picture, leading to increased compression efficiency.

Note the main difference compared with the intra-prediction-based padding described in section 2.1.7.5 of the JVET contribution JVET-J0014 is that here, a switching process between intra prediction and inter prediction happens during the extension step of the reference picture.

In a variant of method 400, in step 403, a syntax element signaled in a bitstream indicates whether padding (step 302) the reference blocks of a reference picture is either based on a motion vector derived from nearest subblock of current blocks inside the video picture or based on an intra-prediction-based padding method.

In a variant, the syntax element may be signaled at a sequence-level, for example in the SPS (Sequence Parameter Set).

In a variant, the syntax element may be signaled at picture-level, for example in the picture parameter set (PPS).

In a variant, the syntax element may be signaled at slice-level.

In a variant of method 400, a reference block is padded based on an intra-prediction-based padding method only for particular type of video picture such as for particular screen and/or graphical video content.

There is provided a method of encoding a video picture into a bitstream of encoded video picture data, the method comprising temporal predicting a video picture block by obtaining a temporal predicted block based on at least one reference block of at least one reference picture pointed to by at least one motion vector associated with the video picture block, wherein if the temporal prediction of the video picture block is based on a single reference block of a reference picture, then the method further comprises padding the reference block based on a motion vector derived from a nearest subblock of the current block inside the video picture.

There is provided a method for decoding a video picture from a bitstream of encoded video picture data, the method comprising temporal predicting a video picture block by obtaining a temporal predicted block based on at least one reference block of at least one reference picture pointed to by at least one motion vector associated with the video picture block, wherein if the temporal prediction of the video picture block is based on a single reference block of a reference picture, then the method further comprises padding the reference block based on a motion vector derived from a nearest subblock of the current block inside the video picture.

In an embodiment, if the temporal prediction of the video picture block is based on a single reference block of a reference picture and if the reference block is located at least partly outside boundaries of the reference picture, then the method further comprises padding the reference block based on a motion vector derived from a nearest subblock of the current block inside the video picture.

In an embodiment, if the temporal prediction of the video picture block is based on a first reference block of a first reference picture and a second reference block of a second reference picture, then the method further comprises obtaining a final motion-compensated prediction of the current video picture block by averaging a first prediction block and a second prediction block on a sample basis according to whether a sample at a given position of the first prediction block is outside boundaries of a first reference picture or not, and according to whether a sample at the same position of the second prediction block is outside boundaries of another reference picture or not.

In an embodiment, the first and second prediction blocks are obtained by using a uni-directional motion-compensated prediction.

In an embodiment, the reference block of the reference picture is padded based on a motion vector derived from a nearest subblock of the current block inside the video picture and/or the reference block of the other reference picture is padded based on a motion vector derived from a nearest subblock of the current block inside the video picture, and the uni-directional motion-compensated prediction is based on either reference blocks or padded reference blocks.

In an embodiment, the first prediction block or the second prediction block is considered as being outside boundaries of the first or second reference picture only when its position in a reference picture is beyond a temporally predicted area extending the reference picture.

In an embodiment, the first prediction block or the second prediction block is considered as being outside boundaries of the first or second reference picture when it is derived from an inter-coded subblock and as being inside the boundaries of the first or second reference picture when it is derived from an intra-coded subblock.

In an embodiment, the nearest subblock is either intra- or inter-coded.

In an embodiment, a syntax element is signaled into the bitstream to indicate whether padding the reference blocks of a reference picture is based on a motion vector derived from nearest subblocks of the current blocks inside the video picture or on an intra-prediction-based padding method.

In an embodiment, the syntax element is signaled at sequence picture or slice level.

There is provided a bitstream of encoded video picture data generated by the above method of the present disclosure.

There is provided an apparatus including means for performing the above method of the present disclosure.

There is provided a computer program product including instructions which, when the program is executed by one or more processors, causes the one or more processors to carry out the above method of the present disclosure.

There is provided a non-transitory storage medium carrying instructions of program code for executing the above method of the present disclosure.

Figure 15:
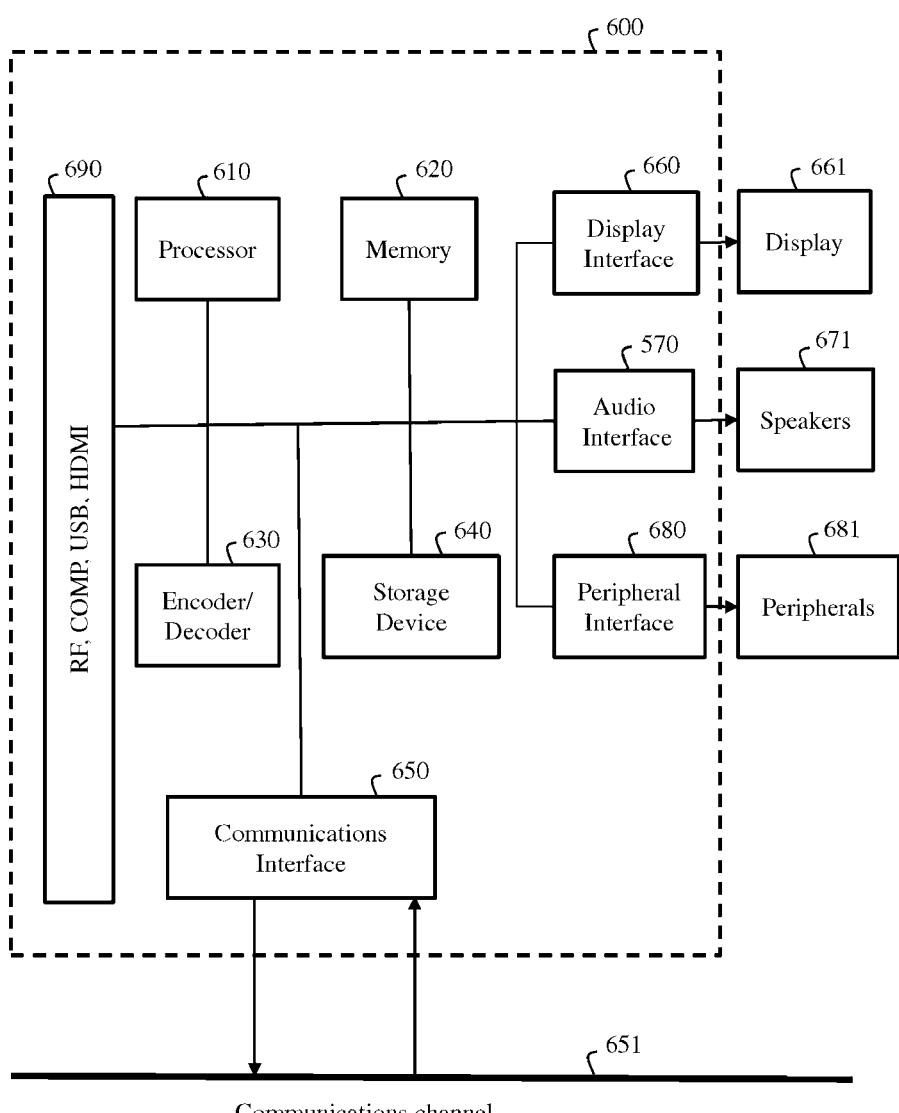
FIG. 15 illustrates a schematic block diagram of an example of a system in which various aspects and exemplary embodiments are implemented.

FIG. 15 shows a schematic block diagram illustrating an example of a system 600 in which various aspects and exemplary embodiments are implemented.

System 600 may be embedded as one or more devices including the various components described below. In various exemplary embodiments, system 600 may be configured to implement one or more of the aspects described in the present disclosure.

Examples of equipment that may form all or part of the system 600 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 600, singly or in combination, may be embodied in a single integrated circuit (IC), multiple ICs, and/or discrete components. For example, in at least one exemplary embodiment, the processing and encoder/decoder elements of system 600 may be distributed across multiple ICs and/or discrete components. In various exemplary embodiments, system 600 may be communicatively coupled to other similar systems, or to other electronic devices, via, for example, a communications bus or through dedicated input and/or output ports.

System 600 may include at least one processor 610 configured to execute instructions loaded therein for implementing, for example, the various aspects described in the present disclosure. Processor 610 may include embedded memory, input output interface, and various other circuitries as known in the art. System 600 may include at least one memory 620 (for example a volatile memory device and/or a non-volatile memory device). System 600 may include a storage device 640, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 640 may include an internal storage device, an attached storage device, and/or a network accessible storage device, as non-limiting examples.

System 600 may include an encoder/decoder module 630 configured, for example, to process data to provide encoded/decoded video picture data, and the encoder/decoder module 630 may include its own processor and memory. The encoder/decoder module 630 may represent module(s) that may be included in a device to perform the encoding and/or decoding functions. As is known, a device may include one or both encoding and decoding modules. Additionally, encoder/decoder module 630 may be implemented as a separate element of system 600 or may be incorporated within processor 610 as a combination of hardware and software as known to those skilled in the art.

Program code to be loaded onto processor 610 or encoder/decoder 630 to perform the various aspects described in the present disclosure may be stored in storage device 640 and subsequently loaded onto memory 620 for execution by processor 610. In accordance with various exemplary embodiments, one or more of processor 610, memory 620, storage device 640, and encoder/decoder module 630 may store one or more of various items during the performance of the processes described in the present disclosure. Such stored items may include, but are not limited to video picture data, information data used for encoding/decoding video picture data, a bitstream, matrices, variables, and intermediate or final results from the processing of equations, formulas, operations, and operational logic.

In several exemplary embodiments, memory inside of the processor 610 and/or the encoder/decoder module 630 may be used to store instructions and to provide working memory for processing that may be performed during encoding or decoding.

In other exemplary embodiments, however, a memory external to the processing device (for example, the processing device may be either the processor 610 or the encoder/decoder module 630) may be used for one or more of these functions. The external memory may be the memory 620 and/or the storage device 640, for example, a dynamic volatile memory and/or a non-volatile flash memory. In several exemplary embodiments, an external non-volatile flash memory may be used to store the operating system of a television. In at least one exemplary embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), AVC, HEVC, EVC, VVC, AV1, etc.

The input to the elements of system 600 may be provided through various input devices as indicated in block 690. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present invention is implemented in the automotive domain.

In various exemplary embodiments, the input devices of block 690 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain exemplary embodiments, (iv) demodulating the down-converted and band-limited signal, (v) performing error correction, and (vi) demultiplexing to select the desired stream of data packets. The RF portion of various exemplary embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various exemplary embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various exemplary embodiments, the RF portion may include an antenna.

Additionally, the USB and/or HDMI terminals may include respective interface processors for connecting system 600 to other electronic devices across USB and/or HDMI connections. It is to be understood that various aspects of input processing, for example, Reed-Solomon error correction, may be implemented, for example, within a separate input processing IC or within processor 610 as necessary. Similarly, aspects of USB or HDMI interface processing may be implemented within separate interface ICs or within processor 610 as necessary. The demodulated, error corrected, and demultiplexed stream may be provided to various processing elements, including, for example, processor 610, and encoder/decoder 630 operating in combination with the memory and storage elements to process the data stream as necessary for presentation on an output device.

Various elements of system 600 may be provided within an integrated housing. Within the integrated housing, the various elements may be interconnected and transmit data therebetween using suitable connection arrangement 690, for example, an internal bus as known in the art, including the I2C bus, wiring, and printed circuit boards.

The system 600 may include communication interface 650 that enables communication with other devices via communication channel 651. The communication interface 650 may include, but is not limited to, a transceiver configured to transmit and to receive data over communication channel 651. The communication interface 650 may include, but is not limited to, a modem or network card and the communication channel 651 may be implemented, for example, within a wired and/or a wireless medium.

Data may be streamed to system 600, in various exemplary embodiments, using a Wi-Fi network such as IEEE 802.11. The Wi-Fi signal of these exemplary embodiments may be received over the communications channel 651 and the communications interface 650 which are adapted for Wi-Fi communications. The communications channel 651 of these exemplary embodiments may be typically connected to an access point or router that provides access to outside networks including the Internet for allowing streaming disclosures and other over-the-top communications.

Other exemplary embodiments may provide streamed data to the system 600 using a set-top box that delivers the data over the HDMI connection of the input block 690.

Still other exemplary embodiments may provide streamed data to the system 600 using the RF connection of the input block 690.

The streamed data may be used as a way for signaling information used by the system 600. The signaling information may comprise the bitstream B and/or information such a number of pixels of a video picture and/or any coding/decoding setup parameters.

It is to be appreciated that signaling may be accomplished in a variety of ways. For example, one or more syntax elements, flags, and so forth may be used to signal information to a corresponding decoder in various exemplary embodiments.

System 600 may provide an output signal to various output devices, including a display 661, speakers 671, and other peripheral devices 681. The other peripheral devices 681 may include, in various examples of exemplary embodiments, one or more of a stand-alone DVR, a disk player, a stereo system, a lighting system, and other devices that provide a function based on the output of system 600.

In various exemplary embodiments, control signals may be communicated between the system 600 and the display 661, speakers 671, or other peripheral devices 681 using signaling such as AV.Link (Audio/Video Link), CEC (Consumer Electronics Control), or other communications protocols that enable device-to-device control with or without user intervention.

The output devices may be communicatively coupled to system 600 via dedicated connections through respective interfaces 660, 670, and 680.

Alternatively, the output devices may be connected to system 600 using the communications channel 651 via the communications interface 650. The display 661 and speakers 671 may be integrated in a single unit with the other components of system 600 in an electronic device such as, for example, a television.

In various exemplary embodiments, the display interface 660 may include a display driver, such as, for example, a timing controller (T Con) chip.

The display 661 and speaker 671 may alternatively be separate from one or more of the other components, for example, if the RF portion of input 690 is part of a separate set-top box. In various exemplary embodiments in which the display 661 and speakers 671 may be external components, the output signal may be provided via dedicated output connections, including, for example, HDMI ports, USB ports, or COMP outputs.

In FIGS. 1-15, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present exemplary embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an disclosure program tangibly embodied on a processor-readable medium.

Instructions may be, for example, in hardware, firmware, software, or a combination. Instructions may be found in, for example, an operating system, a separate disclosure, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 610 or by hardware, or by a combination of hardware and software. As a non-limiting example, the exemplary embodiments may be also implemented by one or more integrated circuits. The memory 620 may be of any type appropriate to the technical environment and may be implemented using any appropriate data storage technology, such as optical memory devices, magnetic memory devices, semiconductor-based memory devices, fixed memory, and removable memory, as non-limiting examples. The processor 610 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described exemplary embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular exemplary embodiments only and is not intended to be limiting. As used herein, the singular forms "a", "an", and "the" may be intended to include the plural forms as well, unless the context clearly indicates otherwise. It will be further understood that the terms "includes/ comprises" and/or "including/comprising" when used in this specification, may specify the presence of stated, for example, features, integers, steps, operations, elements, and/ or components but do not preclude the presence or addition of one or more other features, integers, steps, operations, elements, components, and/or groups thereof. Moreover, when an element is referred to as being "responsive" or "connected" or "associated with" to another element, it may be directly responsive or connected to or associated with the other element, or intervening elements may be present. In contrast, when an element is referred to as being "directly responsive" or "directly connected" to or "directly associated with" other element, there are no intervening elements present.

It is to be appreciated that the use of any of the symbol/ term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present disclosure. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the exemplary embodiment/implementation) is included in at least one exemplary embodiment/implementation. Thus, the appearances of the phrase "in one exemplary embodiment" or "in an exemplary embodiment" or "in one implementation" or "in an implementation", as well any other variations, appearing in various places throughout the present disclosure are not necessarily all referring to the same exemplary embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the present disclosure are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present exemplary embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/ process.

Although some of the diagrams include arrows on communication paths to show a primary direction of communication, it is to be understood that communication may occur in the opposite direction to the depicted arrows.

Various implementations involve decoding. "Decoding", as used in this disclosure, may encompass all or part of the processes performed, for example, on a received video picture (including possibly a received bitstream which encodes one or more video picture) in order to produce a final output suitable for display or for further processing in the reconstructed video domain. In various exemplary embodiments, such processes include one or more of the processes typically performed by a decoder. In various exemplary embodiments, such processes also, or alternatively, include processes performed by a decoder of various implementations described in the present disclosure, for example, As further examples, in one exemplary embodiment "decoding" may refer only to de-quantizing, in one exemplary embodiment "decoding" may refer to entropy decoding, in another exemplary embodiment "decoding" may refer only to differential decoding, and in another exemplary embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present disclosure may encompass all or part of the processes performed, for example, on an input video picture in order to produce an output bitstream. In various exemplary embodiments, such processes include one or more of the processes typically performed by an encoder. In various exemplary embodiments, such processes also, or alternatively, include processes performed by an encoder of various implementations described in this disclosure.

As further examples, in one exemplary embodiment "encoding" may refer only to quantizing, in one exemplary embodiment "encoding" may refer only to entropy encoding, in another exemplary embodiment "encoding" may refer only to differential encoding, and in another exemplary embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present disclosure may refer to "obtaining" various pieces of information. Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this disclosure may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain exemplary embodiments the encoder signals a particular information such as coding parameter or encoded video picture data. In this way, in an exemplary embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various exemplary embodiments. It is to be appreciated that signaling may be accomplished in a variety of ways. For example, one or more syntax elements, flags, and so forth are used to signal information to a corresponding decoder in various exemplary embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure.

The invention claimed is:

1. A method for encoding a video picture into a bitstream of encoded video picture data, the method comprising:
temporal predicting a video picture block by obtaining a temporal predicted block based on at least one reference block of at least one reference picture pointed to by at least one motion vector associated with the video picture block,
wherein if the temporal prediction of the video picture block is based on a single reference block of a reference picture, the method further comprises padding the reference block based on a motion vector derived from a nearest subblock of the current block inside the video picture;

wherein if the temporal prediction of the video picture block is based on a first reference block of a first reference picture and a second reference block of a second reference picture, the method further comprises obtaining a final motion-compensated prediction of the current video picture block by averaging a first prediction block ($P^{L0}$) and a second prediction block ($P^{L1}$) on a sample basis according to whether a sample $$\left(P^{L0}_{(i,j)}\right)$$

at a given position (i,j) of the first prediction block ($P^{L0}$) is outside boundaries of a first reference picture or not, and according to whether a sample $$\left(P^{L1}_{(i,j)}\right)$$

at the same position (i,j) of the second prediction block ($P^{L1}$) is outside boundaries of another reference picture or not;
wherein the first and second prediction blocks are obtained by using a uni-directional motion-compensated prediction;
wherein the reference block of the reference picture is padded based on a motion vector derived from a nearest subblock of the current block inside the video picture and/or the reference block of the other reference picture is padded based on a motion vector derived from a nearest subblock of the current block inside the video picture, and the uni-directional motion-compensated prediction is based on either reference blocks or padded reference blocks.

2. The method of claim 1, wherein if the temporal prediction of the video picture block is based on a single reference block of a reference picture and if the reference block is located at least partly outside boundaries of the reference picture, the method further comprises padding the reference block based on a motion vector derived from a nearest subblock of the current block inside the video picture.

3. The method of claim 1, wherein the first prediction block ($P^{L0}$) or the second prediction block ($P^{L1}$) is considered as being outside boundaries of the first or second reference picture only when its position in a reference picture is beyond a temporally predicted area extending the reference picture.

4. The method of claim 1, wherein the first prediction block ($P^{L0}$) or the second prediction block ($P^{L1}$) is considered as being outside boundaries of the first or second reference picture when it is derived from an inter-coded subblock and as being inside the boundaries of the first or second reference picture when it is derived from an intra-coded subblock.

5. The method of claim 1, wherein the nearest subblock is either intra- or inter-coded.

6. The method of claim 1, wherein a syntax element is signaled into the bitstream to indicate whether padding the reference blocks of a reference picture is based on a motion vector derived from nearest subblocks of the current blocks inside the video picture or on an intra-prediction-based padding method.

7. A method for decoding a video picture from a bitstream of encoded video picture data, the method comprising:

temporal predicting a video picture block by obtaining a temporal predicted block based on at least one reference block of at least one reference picture pointed to by at least one motion vector associated with the video picture block, wherein if the temporal prediction of the video picture block is based on a single reference block of a reference picture, the method further comprises padding the reference block based on a motion vector derived from a nearest subblock of the current block inside the video picture;

wherein if the temporal prediction of the video picture block is based on a first reference block of a first reference picture and a second reference block of a second reference picture, the method further comprises obtaining a final motion-compensated prediction of the current video picture block by averaging a first prediction block ($P^{L0}$) and a second prediction block ($P^{L1}$) on a sample basis according to whether a sample $$(P^{L0}_{(i,j)})$$

at a given position (i,j) of the first prediction block ($P^{L0}$) is outside boundaries of a first reference picture or not, and according to whether a sample $$(P^{L1}_{(i,j)})$$

at the same position (i,j) of the second prediction block ($P^{L1}$) is outside boundaries of another reference picture or not;

wherein the first and second prediction blocks are obtained by using a uni-directional motion-compensated prediction;

wherein the reference block of the reference picture is padded based on a motion vector derived from a nearest subblock of the current block inside the video picture and/or the reference block of the other reference picture is padded based on a motion vector derived from a nearest subblock of the current block inside the video picture, and the uni-directional motion-compensated prediction is based on either reference blocks or padded reference blocks.

8. The method of claim 7, wherein if the temporal prediction of the video picture block is based on a single reference block of a reference picture and if the reference block is located at least partly outside boundaries of the reference picture, the method further comprises padding the reference block based on a motion vector derived from a nearest subblock of the current block inside the video picture.

9. The method of claim 7, wherein the first prediction block ($P^{L0}$) or the second prediction block ($P^{L1}$) is considered as being outside boundaries of the first or second reference picture only when its position in a reference picture is beyond a temporally predicted area extending the reference picture.

10. The method of claim 7, wherein the first prediction block ($P^{L0}$) or the second prediction block ($P^{L1}$) is considered as being outside boundaries of the first or second reference picture when it is derived from an inter-coded subblock and as being inside the boundaries of the first or second reference picture when it is derived from an intra-coded subblock.

11. The method of claim 7, wherein the nearest subblock is either intra- or inter-coded.

12. The method of claim 7, wherein a syntax element is signaled into the bitstream to indicate whether padding the reference blocks of a reference picture is based on a motion vector derived from nearest subblocks of the current blocks inside the video picture or on an intra-prediction-based padding method.

13. An apparatus for decoding a video picture from a bitstream of encoded video picture data, comprising:

a processor; and a memory storing instructions executable by the processor;

wherein the processor is configured to perform the method of claim 7.

14. An apparatus for encoding a video picture into a bitstream of encoded video picture data, comprising:

a processor; and a memory storing instructions executable by the processor;

wherein the processor is configured to perform:

temporal predicting a video picture block by obtaining a temporal predicted block based on at least one reference block of at least one reference picture pointed to by at least one motion vector associated with the video picture block, wherein if the temporal prediction of the video picture block is based on a single reference block of a reference picture, the processor is further configured to perform padding the reference block based on a motion vector derived from a nearest subblock of the current block inside the video picture;

wherein if the temporal prediction of the video picture block is based on a first reference block of a first reference picture and a second reference block of a second reference picture, the method further comprises obtaining a final motion-compensated prediction of the current video picture block by averaging a first prediction block ($P^{L0}$) and a second prediction block ($P^{L1}$) on a sample basis according to whether a sample $$(P^{L0}_{(i,j)})$$

at a given position (i,j) of the first prediction block ($P^{L0}$) is outside boundaries of a first reference picture or not, and according to whether a sample $$(P^{L1}_{(i,j)})$$

at the same position (i,j) of the second prediction block ($P^{L1}$) is outside boundaries of another reference picture or not;

wherein the first and second prediction blocks are obtained by using a uni-directional motion-compensated prediction;

wherein the reference block of the reference picture is padded based on a motion vector derived from a nearest subblock of the current block inside the video picture and/or the reference block of the other reference picture is padded based on a motion vector derived from a nearest subblock of the current block inside the video picture, and the uni-directional motion-compensated prediction is based on either reference blocks or padded reference blocks.

* * * * *